US006932370B2

(12) United States Patent
Jones et al.

(10) Patent No.: US 6,932,370 B2
(45) Date of Patent: Aug. 23, 2005

(54) HUMAN-POWERED, RIDE-ON VEHICLE (75) Inventors: Micheal D. Jones, Tigard, OR (US); Thomas E. Forsyth, Portland, OR (US); Jason M. Giddings, Hillsboro, OR (US)

(73) Assignee: Columbia-Inland Corporation, Oregon City, OR (US)

( * ) Notice: Subject to any disclaimer, the term of this patent is extended or adjusted under 35 U.S.C. 154(b) by 0 days.

(21) Appl. No.: 10/401,393

(22) Filed: Mar. 28, 2003

(65) Prior Publication Data

US 2004/0188977 A1 Sep. 30, 2004

(51) Int. Cl.[7] .................................................. B62K 5/02
(52) U.S. Cl. ........................................................ 280/282
(58) Field of Search ................................ 280/230–258, 280/280, 282; 482/57

(56) References Cited

U.S. PATENT DOCUMENTS

| | | | | | |
|---|---|---|---|---|---|
| 1,020,432 | A | * | 3/1912 | McBarnes | 280/234 |
| 1,536,788 | A | * | 5/1925 | Grady | 280/240 |
| 2,198,942 | A | * | 4/1940 | Leggitt | 280/87.01 |
| 3,498,634 | A | * | 3/1970 | Sheldon | 280/212 |
| 3,760,905 | A | * | 9/1973 | Dower | 185/2 |
| 3,895,825 | A | * | 7/1975 | Sink | 280/234 |
| 4,132,435 | A | * | 1/1979 | Wilson | 280/266 |
| 4,437,677 | A | * | 3/1984 | Ksayian | 280/234 |
| 4,508,358 | A | * | 4/1985 | Erel | 280/234 |
| 4,601,482 | A | * | 7/1986 | Ferez | 280/265 |
| 4,632,414 | A | * | 12/1986 | Ellefson | 280/246 |
| 4,796,907 | A | * | 1/1989 | Geller | 280/220 |
| 4,861,055 | A | | 8/1989 | Jones | |
| 4,886,287 | A | * | 12/1989 | Krause et al. | 280/246 |
| 4,925,200 | A | | 5/1990 | Jones | |
| 4,928,986 | A | * | 5/1990 | Carpenter | 280/234 |
| 4,941,673 | A | * | 7/1990 | Bennett | 280/242.1 |
| 5,209,506 | A | * | 5/1993 | Klopfenstein | 280/240 |
| 5,272,928 | A | * | 12/1993 | Young | 74/137 |
| 5,280,936 | A | * | 1/1994 | Schmidlin | 280/234 |
| 5,284,355 | A | * | 2/1994 | Ishii | 280/287 |
| 5,492,349 | A | * | 2/1996 | Ferez | 280/248 |
| 5,653,663 | A | * | 8/1997 | McCahon | 482/62 |
| 5,690,346 | A | * | 11/1997 | Keskitalo | 280/234 |
| 5,762,350 | A | * | 6/1998 | Jolly | 280/245 |
| 5,829,772 | A | | 11/1998 | Jones | |
| 5,833,256 | A | * | 11/1998 | Gilmore | 280/224 |
| 6,070,894 | A | * | 6/2000 | Augspurger | 280/249 |
| 6,105,985 | A | * | 8/2000 | Cosgrave | 280/248 |
| 6,206,394 | B1 | * | 3/2001 | Olson et al. | 280/244 |
| 6,749,211 | B1 | * | 6/2004 | Yliniemi | 280/254 |

* cited by examiner

Primary Examiner—Lesley D. Morris
Assistant Examiner—Paul Royal, Jr.
(74) Attorney, Agent, or Firm—Robert D. Veritz, PC (57) ABSTRACT

A human-powered, ride-on vehicle, includes a main longitudinal frame member having a steering/drive mechanism mounted thereon for oscillating movement; a driven rear wheel having an axle, a rear sprocket operatively fixed to the rear wheel for coastable engagement therewith; a pair of spaced apart, steerable front wheel located adjacent the other end of the main longitudinal frame member and operatively connected to the steering/drive mechanism; wherein, the steering/drive mechanism include: a teeter arm mounted to the main longitudinal frame member intermediate the ends thereof for pivoting movement in a fore direction and an aft direction; a drive mechanism including first and second drive linkages, wherein the first drive linkage provides a motive force to the driven rear wheel during a first power stroke and the second drive linkage provides a motive force to the driven rear wheel during a second power stroke, and wherein, for equal movement of the teeter arm in the for and aft directions, the motive force of the first powers strokes is between about one to three times that of the second power stroke.

24 Claims, 8 Drawing Sheets

HUMAN-POWERED, RIDE-ON VEHICLE

FIELD OF THE INVENTION

This invention relates to human powered vehicles, and specifically to a human powered vehicle which is suitable for outdoor mobile use, including transportation and recreation, and indoor stationary use.

BACKGROUND OF THE INVENTION

There are many known drive mechanisms for human-powered vehicles. Known drive mechanisms are of the type which are found in a conventional bicycle, which transmits rotary motion from the front crank of a bicycle, powered by the rider's feet, to the driving wheel of the bicycle, which is generally the rear wheel. Various forms of gear mechanisms, such as the well-known nested gear with chain derailleur. Various forms of ratcheting gear drive mechanisms are known, such as those described in Jones's earlier U.S. Pat. No. 4,861,055, granted Aug. 29, 1989, for DRIVE MECHANISM, U.S. Pat. No. 4,925,200, granted May 15, 1990, for a TRICYCLE DRIVE MECHANISM, and U.S. Pat. No. 5,829,772, Nov. 3, 1998, for a RIDE-ON, HUMAN-POWERED VEHICLE DRIVE AND STEERING MECHANISM, and the references cited therein. Other drive mechanisms are known which go back into the mid-1800's.

The above-identified earlier patents disclosed human-powered vehicles (HPVs) which were primarily intended for use by young riders. While such HPVs may be simply enlarged and strengthened to accommodate adult riders, such up-sizing may present problems of disproportionate size and strength for adult riders, who, if in good physical condition, may over-stress an up-scaled HPV, resulting in damage to the HPV and possible injury to the rider. HPVs designed for young riders are generally kept simple, to facilitate use by riders whose motor skills are still developing. Adult HPVs may incorporate more complex systems and gearing suitable for use by adult riders, whose motor skills are presumably fully developed. Thus, the need for an HPV incorporating features of the earlier designs and also constructed for an adult.

One of the ongoing complaints of physically fit individuals is that there are very few fitness activities which translate well between indoor and outdoor locations. Running indoors does not have the same feel as running outdoors. A stationary bike or rowing machine does not perform in the same way that a bicycle or scull does. Placing a conventional bicycle on a dynamometer-type device does not provide the same feel as does riding a bicycle on a street or trail. Rowing machines do not duplicate the characteristics of a racing shell.

SUMMARY OF THE INVENTION

A human-powered, ride-on vehicle, includes a main longitudinal frame member having a steering/drive mechanism mounted thereon for oscillating movement; a rear wheel receiver located adjacent one end of the main longitudinal frame member; a driven rear wheel having an axle, wherein the axle is received in the rear wheel receiver; a rear sprocket operatively fixed to the rear wheel for coastable engagement therewith; a pair of spaced apart, steerable front wheel located adjacent the other end of the main longitudinal frame member and operatively connected to the steering/drive mechanism; wherein, the steering/drive mechanism includes: a teeter arm mounted to the main longitudinal frame member intermediate the ends thereof for pivoting movement in a fore direction and an aft direction; a drive mechanism including first and second drive linkages, wherein the first drive linkage provides a motive force to the driven rear wheel during a first power stroke and the second drive linkage provides a motive force to the driven rear wheel during a second power stroke, and wherein, for equal movement of the teeter arm in the for and aft directions, the motive force of the first power stroke is greater than or equal to that of the second power stroke.

It is an object of the invention to provide a human-powered ride-on vehicle which allows the rider to utilize upper and lower body muscles.

Another object of the invention is to provide a ride-on vehicle which has a low center of gravity.

Yet another objection of the invention is to provide a ride-on vehicle which provides contour support for the rider's lower body.

A further object of the invention is to provide a mechanism for providing exercise which may be used indoors and outdoors.

Another object of the invention is to provide a therapy device which offers a programmed schedule of resistance.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENT

As with the earlier U.S. patents, it is a goal of the human-powered vehicle described herein to enable a rider to use both upper body and lower body muscles to power the vehicle, while simultaneously providing a vehicle having a low center of gravity and frame geometry which is resistant to tipping. Additionally, the vehicle of this invention is suitable for use indoors as a stationary exercise machine, which provides upper and lower body resistance and an aerobic level of activity, and which may easily be converted to an outdoor vehicle for use as transportation and for recreation.

Figure 1:
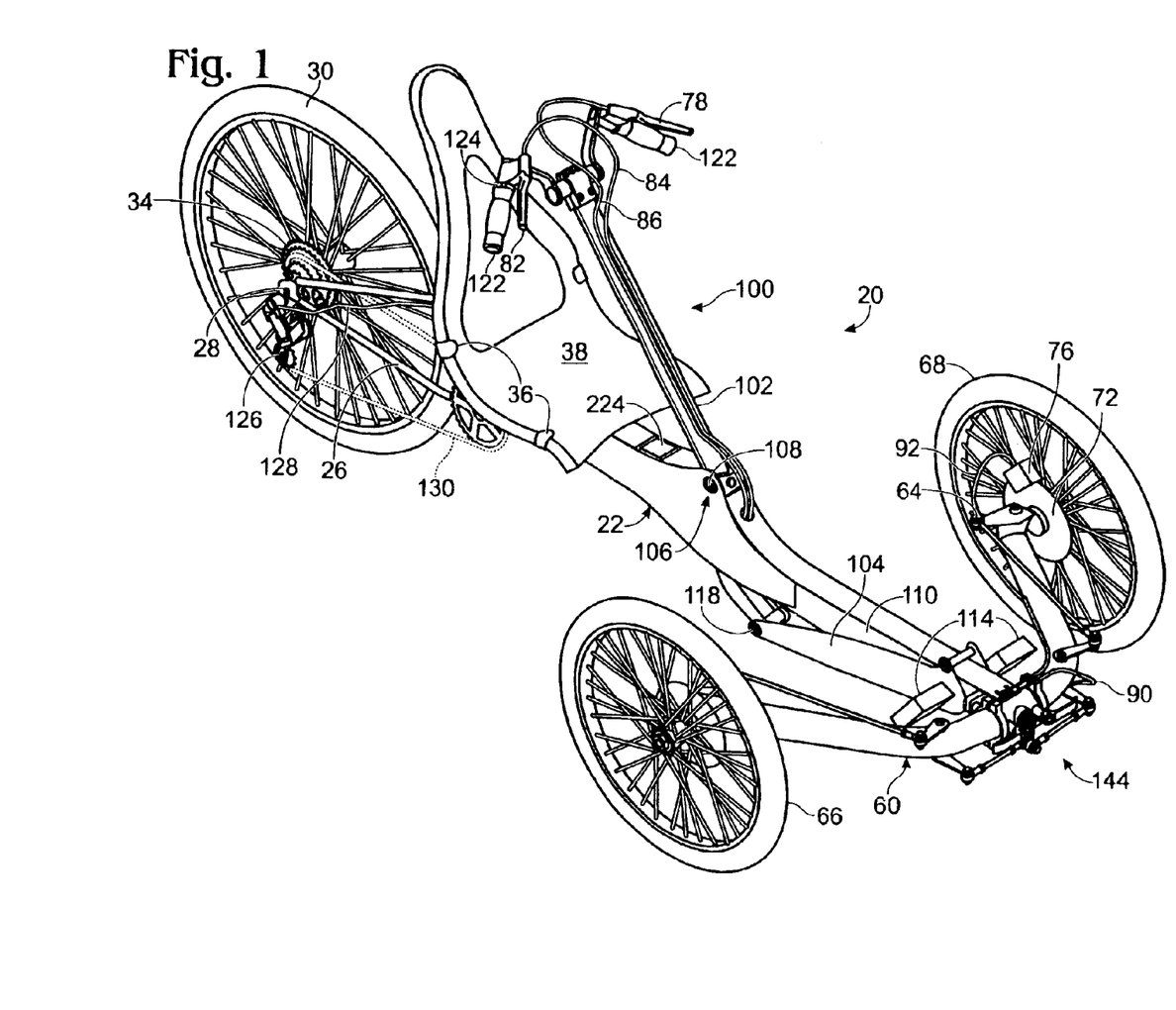
FIG. 1 is a perspective view of the ride-on vehicle of the invention.
Figure 4:
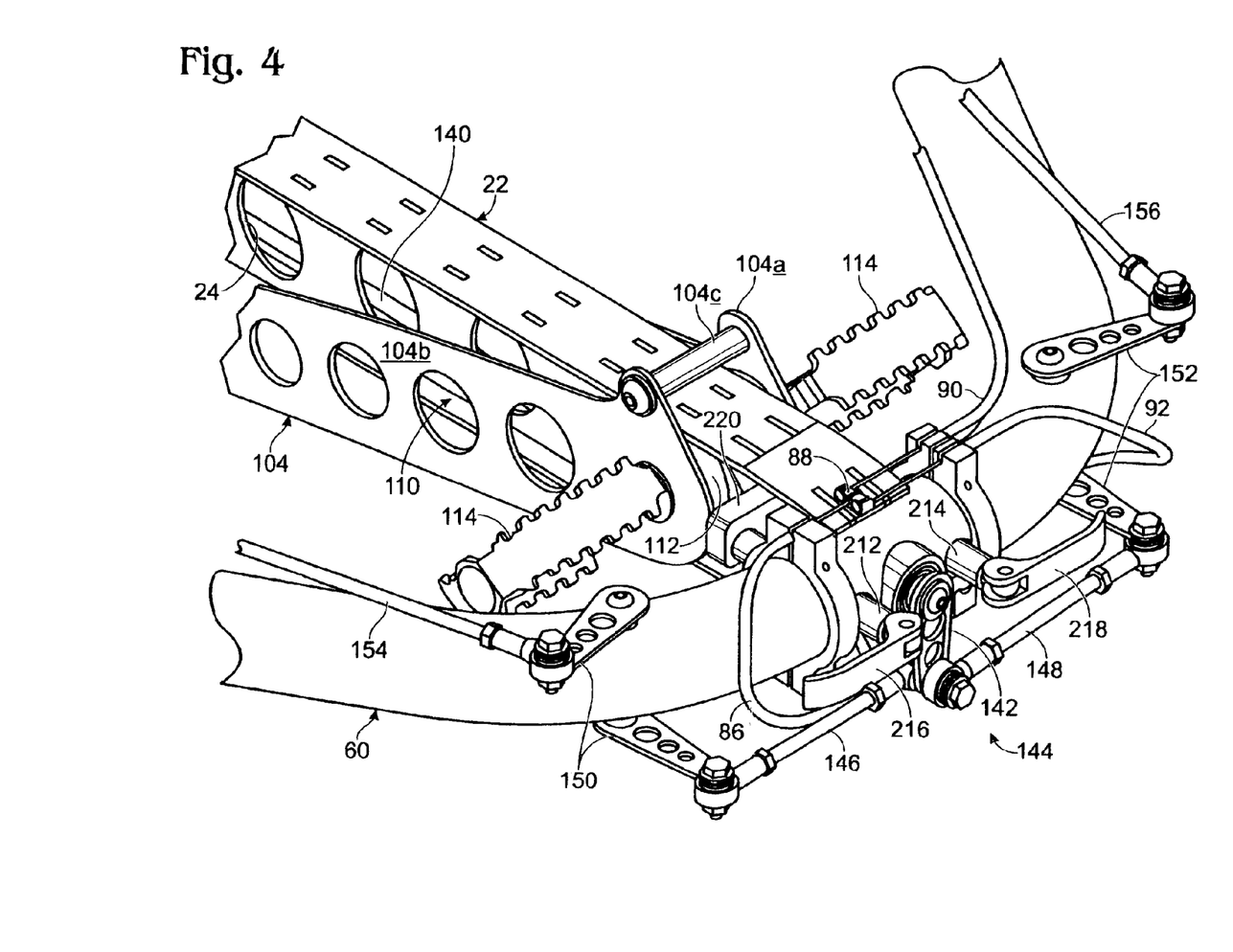
FIG. 4 is an enlarged front quartering-view of the forward end of the vehicle.
Figure 7:
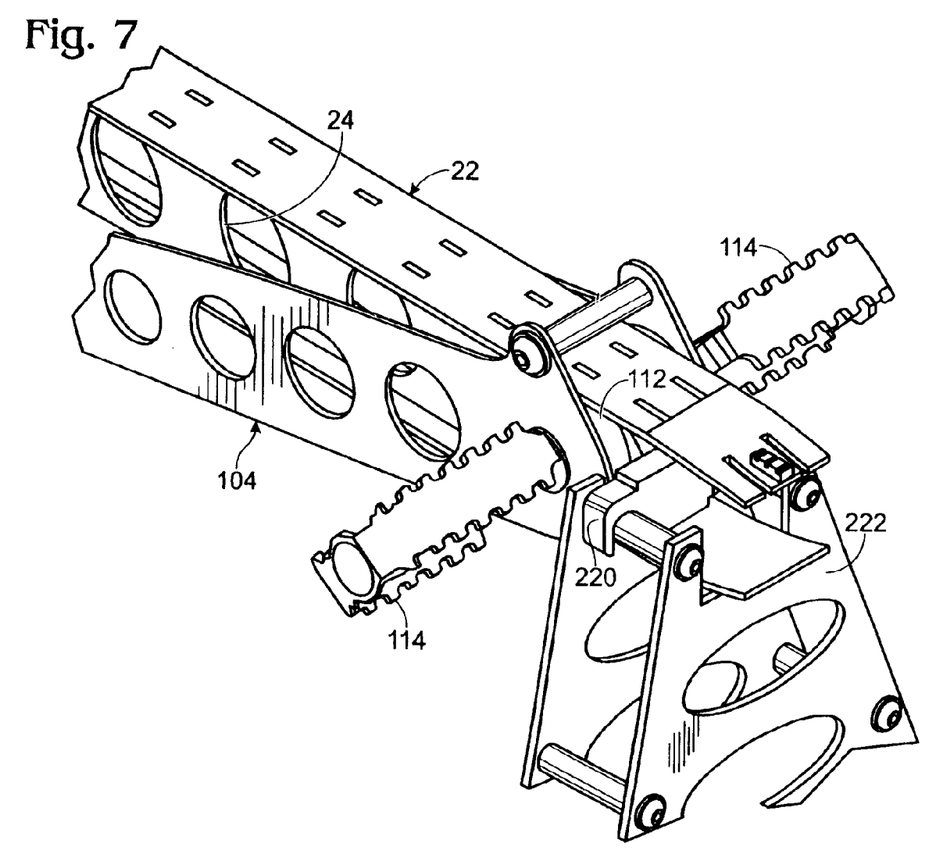

Turning now to the drawings, and initially to FIG. 1, a ride-on, human-powered vehicle HPV is depicted generally at 20. Vehicle 20 includes a main longitudinal frame member 22. Frame member, in the preferred embodiment, is formed of aluminum and steel components, and may include weight-reducing wasted areas therein, such as area 24, shown in FIGS. 4 and 7. The aluminum and steel components are selected to provide maximum strength with minimum weight. A lower frame cover 25 is provided to provide frame rigidity and to partially enclose a drive mechanism.

In one embodiment of vehicle 10, a rear fork 26 is located at the aft end of frame member 22, and, as with a conventional cycle, has a rear-wheel receiver 28 on either side of the frame, for the vehicle rear wheel 30, which is the driven wheel of the invention. The drive mechanism will be described later herein. In another embodiment of vehicle 10, receiver 28 is located adjacent the aft end of frame member 22, which is substantially solid (FIG. 5).

A variety of wheel types may be incorporated into the vehicle, such as a conventional bicycle wheel, with wire spokes, a cast wheel, or an enclosed spoke wheel. The selection of wheel size and width is dependent upon the intended riding terrain of the vehicle: a narrow, high-pressure wheel and tire may be selected for street or stationary use, while a lower-pressure, wide, traction-type wheel and tire may be selected for non-paved riding. In the preferred embodiment, rear wheel carries a twenty-six-inch diameter, 1.50 inch tire. Rear wheel is equipped with a single, caliper-type brake 32, which is fixed to rear fork 26. A rear sprocket 34 is attached to rear wheel 30, and, in the preferred embodiment, comprises a ganged sprocket having an eight-gear cluster, which is fixed to rear wheel 30 for coastable engagement therewith.

Figure 2:
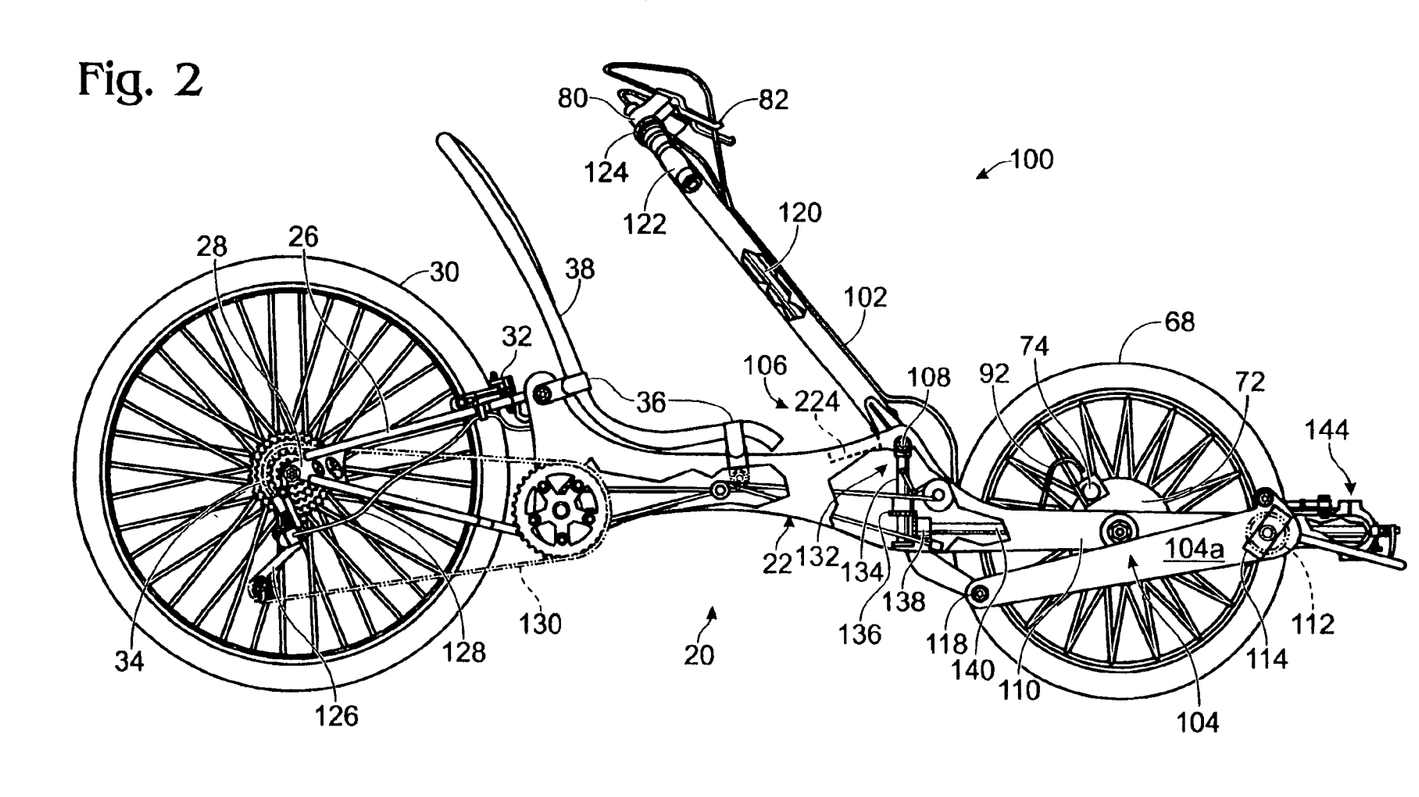
FIG. 2 is a right-side elevation of the vehicle of FIG. 1, with portions broken away to show detail of a drive mechanism and a steering mechanism.
Figure 3:
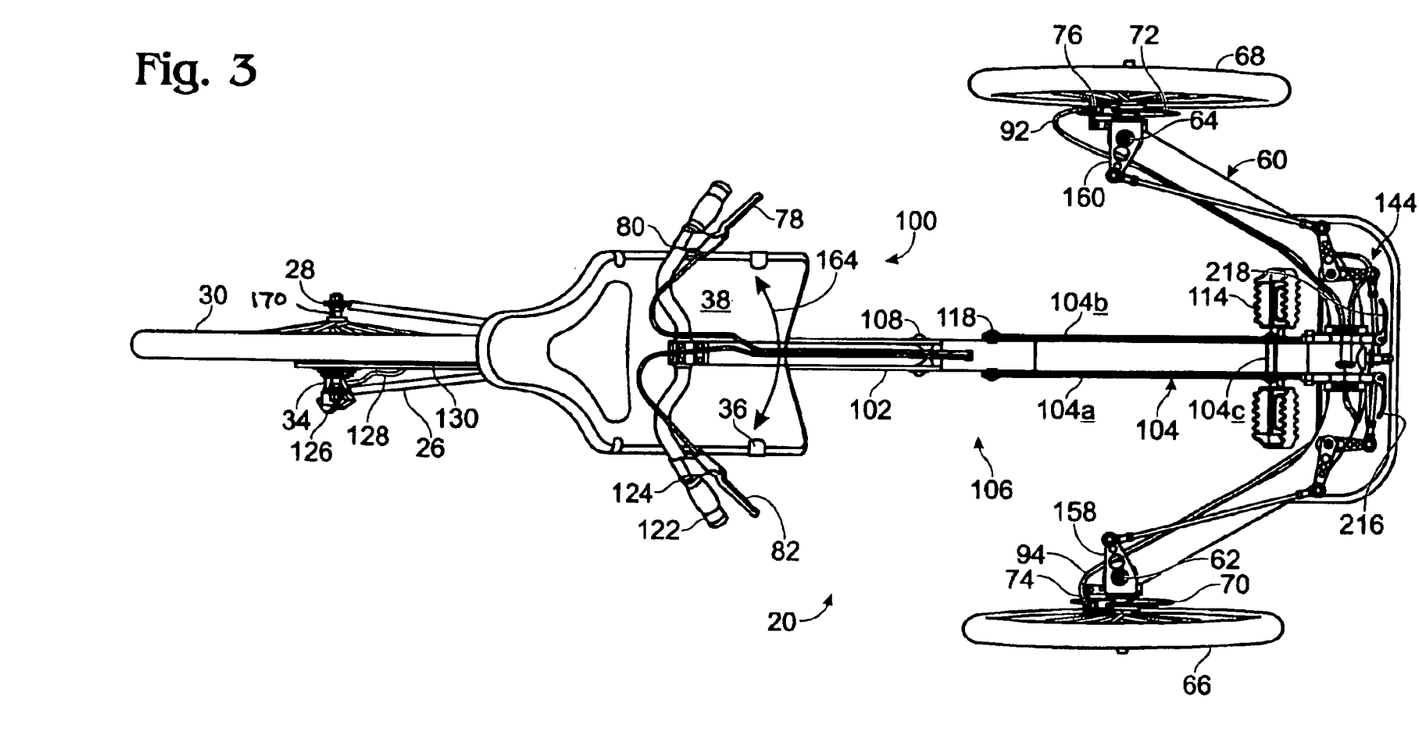
FIG. 3 is a top plan view of the vehicle.
Figures 5, 6:
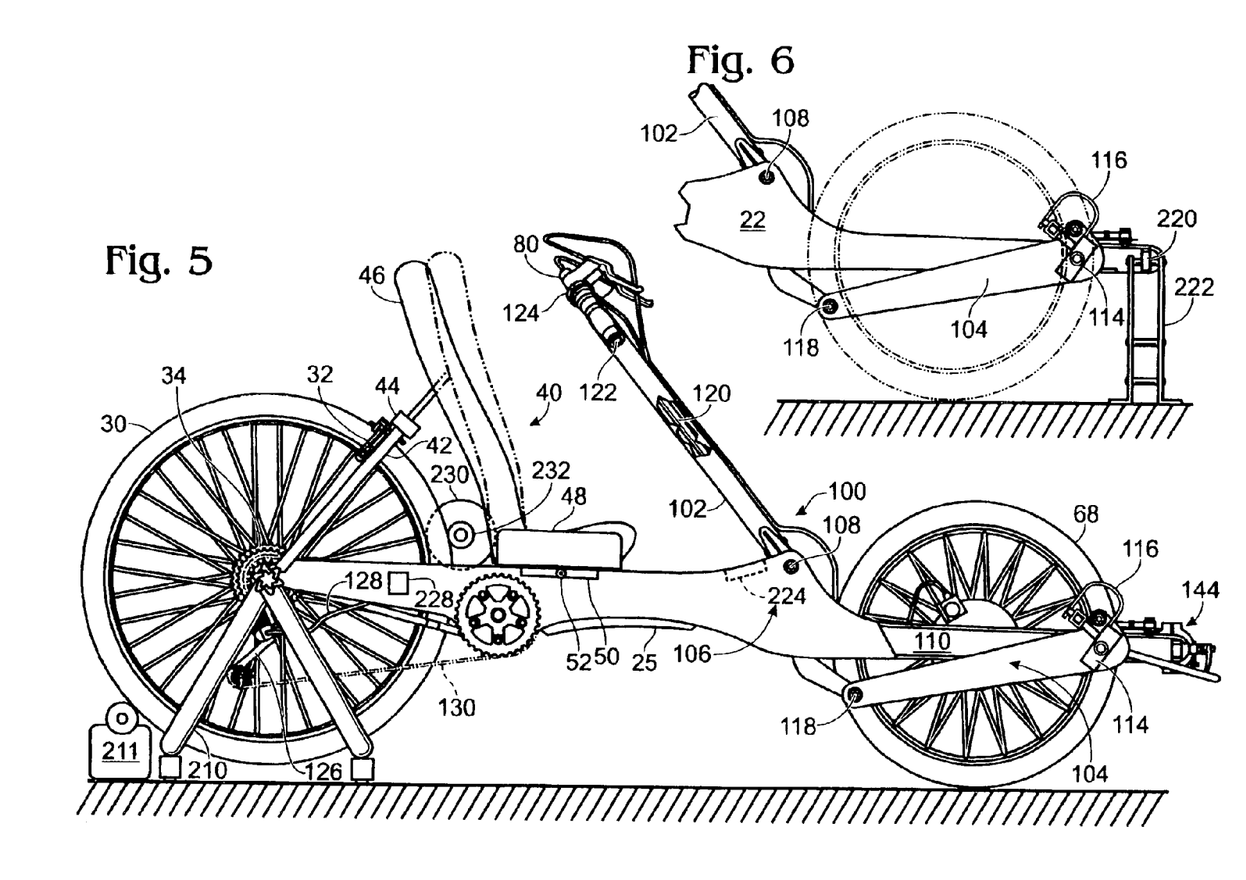
FIGS. 5–7 depict the vehicle configured for stationary use.

Referring now to FIGS. 1–5, frame member 22 includes seat mounts, which secure a molded, light-weight plastomer seat to the frame. The seat is provided in two forms: a fixed seat 36, shown in FIGS. 1 and 2, is held in place by seat brackets 38. An adjustable seat 40, shown in FIG. 5, is supported by seat back supports 42, which have an adjustable telescoping mechanism 44 to adjust the recline of seat back 46. Seat back supports 42 are attached to frame member 22 adjacent receiver 28. A lower portion 48 of seat 40 is movable along a track 50 on frame 22, and is held in place by a tensioning mechanism 52, which hold seat 40 in a desired fore-and-aft position. In some embodiments, a seat belt or harness may be provided to secure the rider to the vehicle, particularly in a racing embodiment of the vehicle.

A transverse frame member 60 is fixed to the forward end of frame member 22, for supporting vehicle front wheels, and carries two king pin assemblies 62, 64, which rotatable support two front wheels and tires, 66, 68, respectively. In the preferred embodiment, the front wheels carry a twenty-inch diameter, 1.50 inch tire. Tires of size one inch to two inches may be fitted onto the vehicle once the vehicle is equipped with the proper wheels and rims, depending on the individual rider and the intended terrain. Each wheel is equipped, in the preferred embodiment, with a disc brake rotor 70, 72. A disc brake caliper 74, 76, is located adjacent and for coaction with each disc brake rotor 70, 72, respectively. The brake caliper is activated by a brake hand lever 78, located on a handle bar 80. A rear brake lever 82 is also mounted on handle bar 80, and is connected to rear brake 32 by a rear brake cable 84. A front brake cable collectively includes a first front brake cable 86, extending from the front brake hand lever connected to a brake connection joint 88 to caliper cables 90, 92, running to brake calipers 74, 76, respectively, for operating brake calipers 90, 92 in unison. Transverse frame member 60, in addition to carrying wheels, includes a portion of the steering mechanism of the vehicle, which will be described in more detail later herein.

A steering/drive mechanism 100 includes a teeter arm 102 having handle bar 80 located at one end thereof and an oscillating, longitudinal frame member 104 affixed to the other end thereof. Oscillating, longitudinal frame member 104 includes two side elements, 104a and 104b, which are joined together at the forward ends thereof by a cross piece 104c. Frame member 22 includes a steering/power mechanism mount 106, also referred to herein as a teeter arm mount, thereon which receives the steering/drive mechanism, which is mounted for fore-and-aft oscillating motion relative to frame member. Mechanism 100 is held in place in mount 106 by a fastener 108. An oscillating longitudinal frame member 104, also part of steering/drive mechanism 100, is held in a channel 110 on frame member 22 by roller bearings 112, which are rotatably fixed to the forward end of oscillating longitudinal frame member 104, which allows the aforementioned oscillating motion. Foot pedal 114 support a rider's feet on the vehicle, and may include toe clips 116. Pedals 114 are fixed in bores extending through side elements 104a, 104b. Plural bores are provided to allow adjustment of pedal position to accommodate a rider's leg extension.

Oscillating longitudinal frame member 104 is fixed to the lower end of teeter arm 102 by a pivoting fastener mechanism 118. Steering/drive mechanism further includes an upper steering shaft 120, which is received within teeter arm 102, and which is connected to handle bar 80. Handle bar 80 carries a handle bar grip 122 at either end thereof, and also carries front brake lever 78 and rear brake lever 82. Additionally, a shifter handle 124 is provided to operate a derailleur 126, operable by a shifter cable 128 to move a main drive chain 130 on rear sprocket 34. The steering shafts are received in teeter arm 102 for oscillating movement therewith and for rotatable movement on the bearings therein.

Steering/drive mechanism provides power, or motive force, to rear wheel 30. A rider seated in seat 38, 40 applies muscle power to the vehicle by simultaneously pulling rearward on handle bar 80 and pushing forward on pedals 114 located on oscillating longitudinal frame member 104, referred to herein as a first power stroke, or PS1. Power may also be applied to the vehicle on a return stroke, or second power stroke, PS2, by pushing forward on handle bar 80 and pulling rearward on pedals 114, when pedal 114 are equipped with toe clips 116. Should pedal 114 not be equipped with toe clips, the rider's legs do not provide power on the return stroke, which receives only upper body power.

The steering mechanism includes upper steering shaft 120 located within teeter arm 102. Handle bar 80 is connected to the top end of upper steering shaft, and a universal joint 132 is located at the bottom end of upper steering shaft 120. Upper steering shaft 120 is mounted in teeter arm 102 by bearings. A lower steering shaft 134 is connected to universal joint 132, and is also bearing mounted. A first bevel gear 136, in the preferred embodiment, is located on the bottom terminus of lower steering shaft 134, and a second bevel gear 138 is located on one end of a steering torque tube 140. Steering torque tube 140 is bearing mounted, and extends through the front of frame member 22, terminating in a removable crank 142. A steering arm mechanism 144 is attached to crank 142, and provides turning forces to front wheels 66, 68 through lower steering arms 146, 148, bell cranks 150, 152, upper steering arms 154, 156, and steering brackets 158, 160, respectively. The upper and lower steering arms, as depicted in the figures, are of adjustable length to allow proper alignment of the front wheels. Front wheel 66, 68 are mounted on transverse frame member 60 in a Ackerman Compensated Geometry, in the preferred embodiment, with a 5° forward caster, a 3° inward camber and 2° of toe-in, which parameters are rider adjustable by adjustments to the king pins, bell cranks and steering arms.

Figure 8:
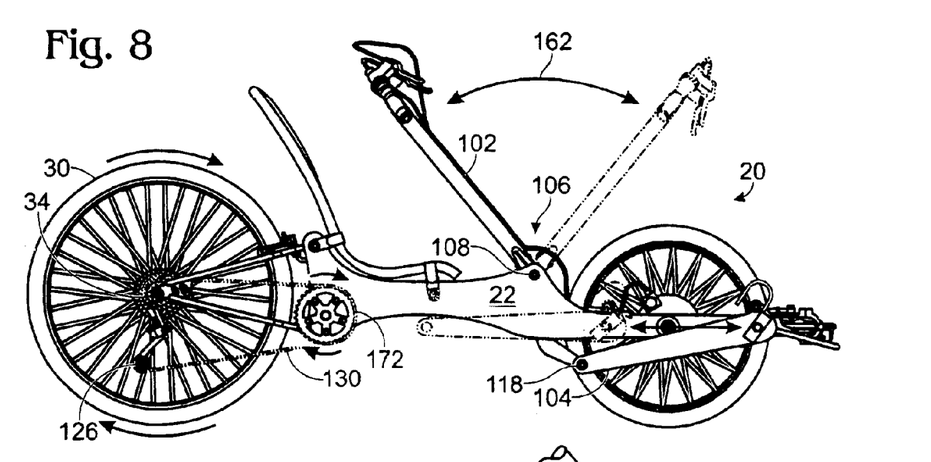
FIGS. 8–11 depict the drive mechanism of the vehicle.
Figure 9:
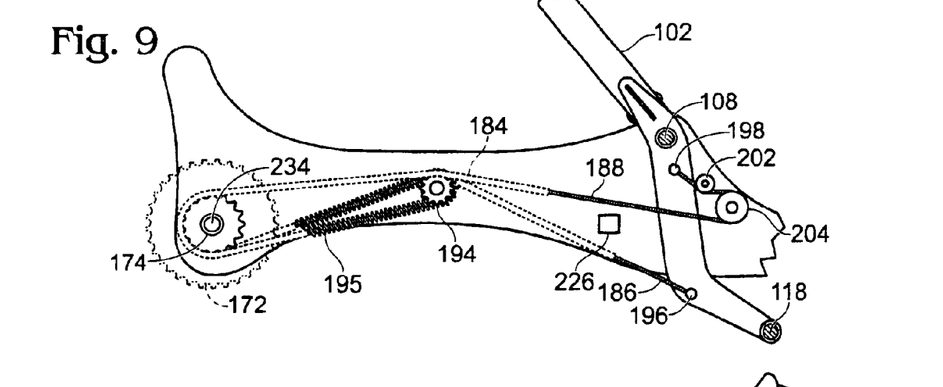
Figure 10:
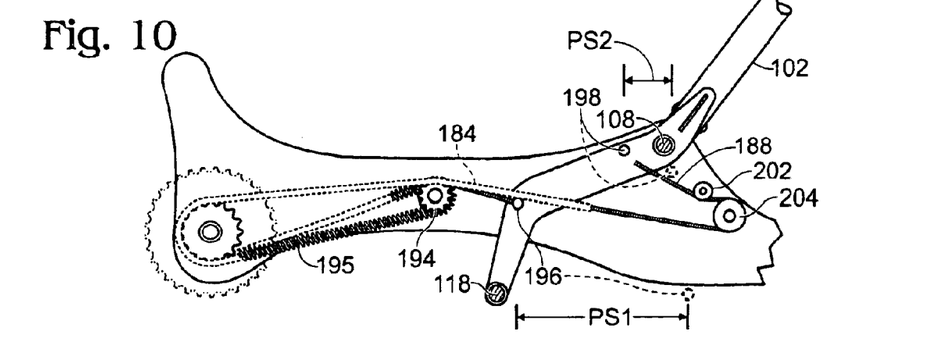
Figure 11:
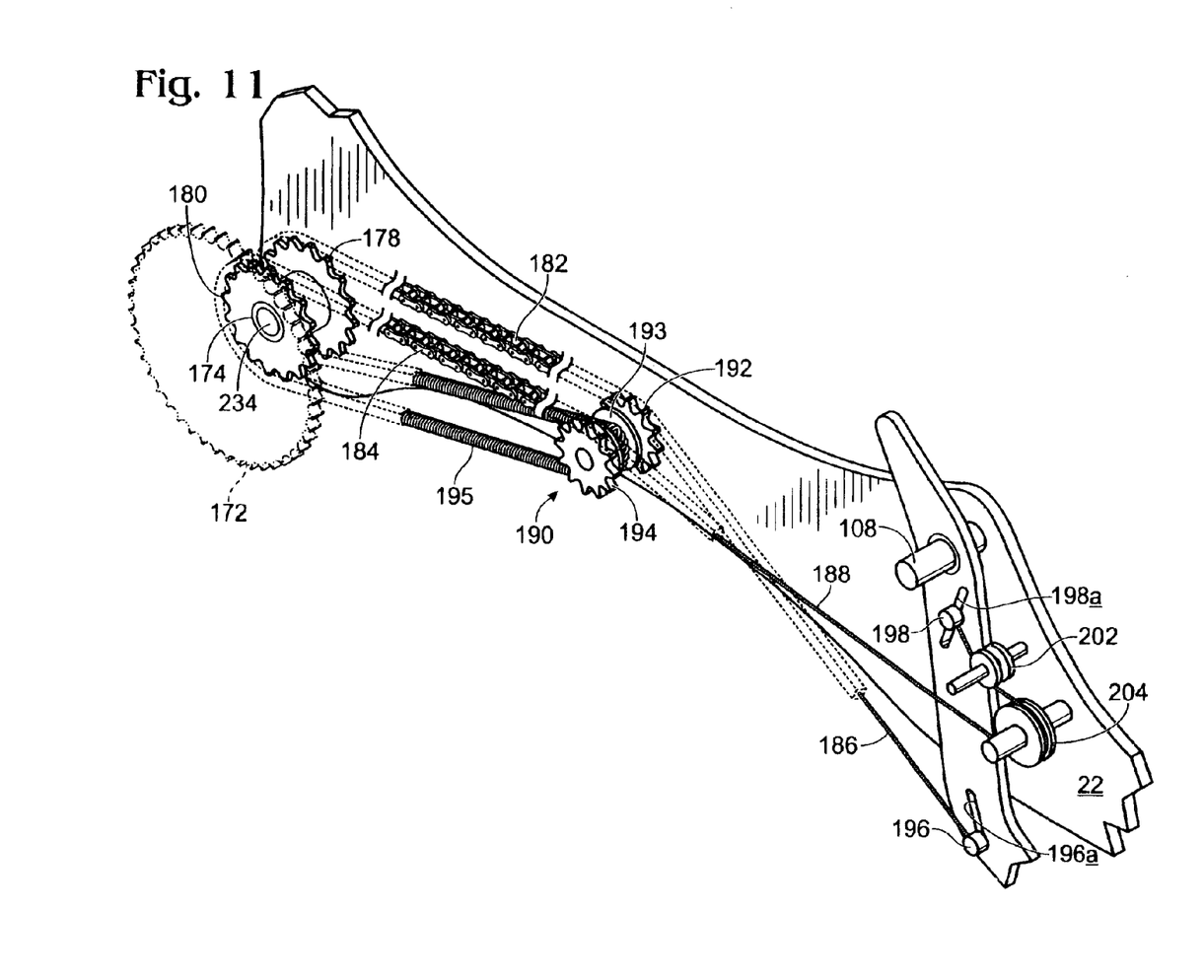

Universal joint 132 allows for the simultaneous oscillation of upper steering shaft 120 relative to lower steering shaft 134, as indicated by double headed arrow 162 (FIG. 8), while also allowing turning of handle bar 80, as indicated by double headed arrow 164 (FIG. 3), which steers front wheels 66, 68.

Referring now to FIGS. 8–11, the drive mechanism is shown in greater detail. Beginning at the rear of the vehicle, a rear wheel axle 170 is received in wheel receivers 28 of frame member 22, or rear fork 26. Axle 170 carries rear wheel 30 thereon. Rear wheel 30, in the preferred embodiment, carries an eight-gear rear sprocket, which is mounted for coasting free-wheeling. Derailleur 126 is mounted on frame member 22 and is connected to shifter 124 by shifter cable 128. Main drive chain 130 extends between rear sprocket 34 and a front sprocket 172. The front sprocket, in the preferred embodiment, is a single sprocket, however, one of ordinary skill in the art will recognize that both the front and rear sprocket may contain multiple gears of varying sizes, and the vehicle may be equipped with two derailleurs and shifters for greater gear selection. A variety of automatic cycle transmissions may also be incorporated into the vehicle.

The drive mechanism, as previously noted, includes oscillating longitudinal frame member 104 with its associated pedals. Oscillating longitudinal frame member 104 is connected, at its rear end, to the lower end of teeter arm 102 by a pivot joint 118. The front end of oscillating longitudinal frame member rides in a channel 110 formed in frame member 22. A roller bearing 112 is located on either interior side of oscillating longitudinal frame member 104 and contacts channel 110.

Front sprocket 172 is carried on a front axle 174 extending through frame member 22. The front axle also carries a racheting mechanism 176 which receives power from steering/drive mechanism 100. Racheting mechanism 176 includes a first and second drive linkages having a pair of cycle transmission gears 178, 180, referred to herein as first (178) and second (180) drive sprockets, of the type generally used in BMX cycles. A first drive chain 182 and a second drive chain 184 are trained over the first and second drive sprockets, and are connected to a first drive cable 186 and a second drive cable 188, respectively. The drive mechanism, in the preferred embodiment, includes a front idler set 190, including idler sprockets 192, 194, which support drive chains 182, 184, respectively, and an idler pulley 193, which supports an idler spring 195. First drive cable 186 is connected to teeter arm 102 at a lower connection point 196 while second drive cable 188 is connected to an upper connection point 198. The free ends of drive chains 182 and 184 are connected to idler spring 195, which is trained over center idler pulley 193. Second drive cable 188 extends from upper connection point 198 over idler pulleys 202, 204. First drive chain 182 is trained over the top of idler sprocket 192 and the top of first drive sprocket 178, while second drive chain 184 is trained over the top of idler sprocket 194 and the top of second drive sprocket 180. First drive linkage thus includes first drive sprocket 178, first drive chain 182, first drive cable 186 and lower connection point 196. Second drive linkage includes second drive sprocket 180, second drive chain 184, second drive cable 188 and upper connection point 198. Lower connection point 196 and upper connection point 198 may be located in a slots 196a, 198a, respectively, to provide for adjustment of the connection points, and thus the relative power of the two power strokes.

Thus, when teeter arm 102 is pulled rearward (FIG. 9), the first power stroke (PS1), tension on first drive cable 186 and first drive chain 182 causes first drive sprocket 178 to rotate in its power applying direction. When teeter arm 102 is pushed forward, the second power stroke (PS2), tension on second drive cable 188 and second drive chain 184 causes second drive sprocket 180 to rotate in its power applying direction.

It may be seen in FIGS. 8–11 that the relationship of upper connection point 198 and lower connection point 196 provides, with each oscillating movement of teeter arm 102, a greater displacement of lower connection point 196 than that of upper connection point 198. One of ordinary skill in the art will recognize that a rider can exert, in the configuration of vehicle 10, much more force when simultaneously pushing with the rider's legs and pulling with the rider's arms, the first power stroke, than when pushing with the rider's arms, the second power stroke, even if the vehicle is equipped with toe clips on pedals 114 so that the legs may be used to pull in the second power stroke. Therefore, the upper and lower connection points are arranged, at maximum setting, with lower connection point 196 located at the bottom of slot 196a, and upper connection point 198 located at the top of slot 198a, so that a rider may exert approximately three times as much force during the first power stroke than during the second power stroke. When lower connection point 196 is located at the top of slot 196a, and upper connection point 198 located at the bottom of slot 198a, a rider may exert approximately equal force during the first power stroke and the second power stroke. Both the upper and lower connection points are located on teeter arm 102 below steering/drive mechanism mount 106: in the preferred embodiment, a 2.5:1 power stroke ratio is provided, with upper connection point 198 being approximately 2.8 inches below mount 106, while lower connection point 196 is approximately 7 inches below mount 106. Thus, the first drive linkage moves further, displacement PS1 in FIG. 10, in a single power stroke, than does second drive linkage, displacement PS1 in FIG. 10, in a power stroke of the same length, e.g., for the same horizontal displacement of handlebar 80.

For use as a stationary exercise device, the vehicle of the invention, as shown in FIGS. 4–7, may be placed on a stand 210 providing resistance to rear wheel 30. Stand 210 is fixed to rear axle 170, and applies rider-adjustable drag to rear wheel 30. Stand 210 may be equipped with an adjustable, programmable dynamometer 211, for varying the resistance on rear wheel 30 according to a programmed schedule of resistance.

Transverse frame member 60 may be removed for use of vehicle 10 as a stationary device, and to facilitate passage through narrow doorways. Transverse frame member 60 is secured to the front of frame member 22 by a pair of spaced apart pins 212, 214, each having a cam lever 216, 218, respectively, associated therewith. When the cam levers are released, e.g., moved towards the centerline of the frame member, pins may be removed from receivers located at the front of frame member. Cable 86 is disconnected from brake connector joint 88, and transverse frame member 60 may be separated from the remainder of the vehicle. A plate 220 at the front of frame member 22 is placed on a stand 222 to support the front of vehicle 10 in this configuration.

Transverse frame member 60 is depicted, in the preferred embodiment, as being somewhat "U" shaped and secured to the front end of frame member 22, however, the transverse frame member may be secured to the main longitudinal frame member below and adjacent mount 106, and may be oriented with the arms of the "U" extending forward. Such a configuration provides a shorter effective load on frame member 22, and also make the vehicle more compact when disassembled for shipping.

Vehicle 10 may be provided with a display 224, likely of the LCD variety, to provide stroke and speed information from a stroke sensor 226 (FIG. 9) and a speed sensor 228 (FIG. 5), respectively. Display 224, also referred to herein as a vital signs and ride profile monitor, may also be provide with rider vital sign readout, using input from pulse, blood pressure and breathing rate sensor worn by a rider. The vital sign readout may be hard-wired to the sensors, or may use low power RF or IR transmission. Display 224 includes a CPU, memory and power supply, and suitable I/O ports for connection to a computer, which allow a rider to select and set various parameters, such as maximum heart rate, blood pressure and/or vehicle speed, which, when the vehicle is operated outside of the parameter set, will sound an alarm to alert the rider of the condition. The vital signs and ride profile monitor includes a maximum heart rate set mechanism for setting a maximum allowable heart rate.

Vehicle 10 may be equipped with a power-assist electric motor and battery 230, having a drive wheel 232 which selectively engages rear wheel 30 to provide an auxiliary motive force. A torque sensor 234, associated with front axle 174, provides information relating to the amount of effort required to propel vehicle 10. Display 224 includes input keys so that a rider may set resistance levels, which, with display 224 connected to dynamometer 211, will control the resistance to the rear wheel, thus simulating a ride over an uneven terrain. Display 224 and its CPU may be programmed to "record" a ride, i.e., a rider may ride a particular course over a period of time. The stroke rate, speed, and torque information is recorded in a memory portion of display 224. At a later time, display 224, also referred to herein as a vital signs and ride profile monitor, may be connected to dynamometer 211, and the ride played back, i.e., the CPU of display 224 will set resistance in dynamometer 211 to simulate the recorded ride. Such ride information may be downloaded and stored in a PC so that a rider may records and store a variety of rides, or, the rider may program a ride from a PC. The stroke rate sensor, speed sensor and torque sensor provide stroke rate, speed and torque information, which is referred to herein as a ride profile, to the vital signs and ride profile monitor. The ride profile is stored in the memory during a ride, and may be downloaded to program dynamometer 211 to simulate the stored ride profile. The ride profile may be stored during an indoor or outdoor ride, or may be generated on display 224, for simple profiles, or on a computer and loaded into display 224.

Another feature of display 224 is that, when the power-assist motor is operational, and a maximum heart rate is programmed into the CPU, the power-assist motor will provide assistance as the rider's heart rate approaches its pre-set maximum value, or if an associated maximum torque value is set, the power-assist motor will provide assistance as the maximum torque value is approached and reached. This will occur as the rider starts from a stop, or if the gearing is set too high for a standing start.

As previously noted, it is an object of the invention to provide a vehicle which has a low center of gravity and which is extremely stable. To this end, the vehicle is configured such that the rider's weight is located at or below the level of rear axle. It may be seen that in order for the vehicle to tip, extreme lateral forces have to be applied thereto.

Given the preferred embodiment for wheels and tires, a forward sprocket having 36 teeth and an eight gear rear sprocket ranging from 11 to 32 teeth, a cadence of 30 strokes-per-minute, wherein each stroke is a complete forward-to-backward movement of teeter bar, the vehicle has a nominal speed of approximately five mph in its lowest gear, and a nominal speed of approximately 16 mph in its highest gear. As presented herein, the vehicle has a weight of about 55 pounds and an overall length just under 90 inches. The nominal width with transverse frame member and wheels mounted is less than 40 inches.

Thus, a human-powered, ride-on vehicle has been disclosed, which has a very low center of gravity and high stability. Although a preferred embodiment of the invention has been disclosed, it should be appreciated that variations and modifications may be made thereto without departing from the scope of the invention, as defined in the appended claims.

We claim:

1. A human-powered, ride-on vehicle, comprising:
   a main longitudinal frame member having a steering/drive mechanism mounted thereon for oscillating movement;
   a rear wheel receiver located adjacent one end of said main longitudinal frame member;
   a driven rear wheel having an axle, wherein said axle is received in said rear wheel receiver;
   a rear sprocket operatively fixed to said rear wheel for coastable engagement therewith;
   a pair of spaced apart, steerable front wheel located adjacent the other end of said main longitudinal frame member and operatively connected to said steering/drive mechanism;
   wherein, said steering/drive mechanism includes:
      a teeter arm mounted on a teeter arm mount to said main longitudinal frame member intermediate the ends thereof for pivoting movement in a fore direction and an aft direction;
      a handle bar located atop said teeter arm for use by a rider to impart a motive force to the vehicle;
      a drive mechanism including first and second drive linkages, wherein said first drive linkage provides a motive force to said driven rear wheel during a first power stroke and said second drive linkage provides a motive force to said driven rear wheel during a second power stroke, and wherein said drive linkages are connected to said teeter arm so that, for equal movement of said teeter arm in said for and aft directions, the motive force of said first power stroke is between about one to three times that of said second power stroke, wherein said first drive linkage is connected to a lower connection point located below said teeter arm mount on said teeter arm and provides power during a first power stroke, and wherein said second drive linkage is connected to an upper connection point located below said teeter arm mount and provides power during a second power stroke, and wherein said drive linkages each include a connection point on said teeter arm, a drive chain connected at one end thereof to said connection point, and a drive sprocket driven by said drive chain; and which includes a drive axle extending through and operable with said drive sprockets to drive a front sprocket, which is connected to said rear sprocket by a main chain.

2. The vehicle of claim 1 which further includes a transverse frame member located adjacent the front end of said main longitudinal frame member for supporting said front wheels, and which further includes, for each wheel, a king pin steerably mounted to said transverse frame member for receiving thereon a front wheel, and a steering mechanism located intermediate said steering drive mechanism and said front wheels.

3. The vehicle of claim 2 wherein said steering mechanism includes said handle bar located atop said teeter arm; steering shafts extending through said teeter arm for oscillating movement therewith and rotatable movement therein, having said handle bar fixed to the upper terminus thereof; a steering torque tube connected to the lower terminus of said steering shafts and extending through the forward end of said main longitudinal frame member; a removable crank fixed to the forward end of said steering torque tube; and, for each front wheel: an adjustable length first steering arm having one end thereof attached to said removable crank; a bell crank attached to the other end of said first steering arm; an adjustable length second steering arm attached at one end thereof to said bell crank and attached at the other end thereof to said king pin.

4. The vehicle of claim 3 wherein said transverse frame member is removable from said vehicle.

5. The vehicle of claim 1 which includes a brake rotor mounted on each of said front wheels, a brake caliper for each rotor, and a hand lever and brake cable to operate the brake calipers in unison.

6. The vehicle of claim 1 which further include an oscillating longitudinal frame member received for oscillating movement in a channel in said main longitudinal frame member, wherein said oscillating longitudinal frame member is pivotally connected to said teeter arm for providing motive force to the vehicle, and wherein said oscillating longitudinal frame member has foot pedal located thereon.

7. The vehicle of claim 1 which includes an idler pulley having an idler spring trained therethrough, and wherein the ends of said idler spring are connected to the free ends of said drive chains.

8. The vehicle of claim 1 which includes a seat mounted on said main longitudinal frame, wherein said main longitudinal frame includes an adjustable seat mount for providing fore and aft movement of said seat, and which further includes an adjustable seat back support for adjusting the incline of said seat back.

9. The vehicle of claim 1 wherein said rear sprocket includes plural, ganged sprockets, and which further include a derailleur and shifter for moving a main drive chain to a selected one of said ganged sprockets.

10. A human-powered, ride-on vehicle, comprising:
   a main longitudinal frame member having a steering/drive mechanism mounted thereon for oscillating movement;
   a rear wheel receiver located adjacent one end of said main longitudinal frame member;
   a driven rear wheel having an axle, wherein said axle is received in said rear wheel receiver;
   a rear sprocket operatively fixed to said rear wheel for coastable engagement therewith;
   a pair of spaced apart, steerable front wheel located adjacent the other end of said main longitudinal frame member and operatively connected to said steering/drive mechanism;
   wherein, said steering/drive mechanism includes:
      a teeter arm mounted on a teeter arm mount to said main longitudinal frame member intermediate the ends thereof for pivoting movement in a fore direction and an aft direction;
      a handle bar located atop said teeter arm for use by a rider to impart a motive force to the vehicle;
      an oscillating longitudinal frame member received for oscillating movement in a channel in said main longitudinal frame member, wherein said oscillating longitudinal frame member is pivotally connected to said teeter arm for providing motive force to the vehicle, and wherein said oscillating longitudinal frame member has foot pedals located thereon;
      a drive mechanism including first and second drive linkages, wherein said first drive linkage provides a motive force to said driven rear wheel during a first power stroke and said second drive linkage provides a motive force to said driven rear wheel during a second power stroke; wherein said drive linkages each include a connection point to said teeter arm, a drive chain connected to said connection point, and a drive sprocket driven by said drive chain; and which includes a drive axle extending through and operable with said drive sprockets to drive a front sprocket, which is connected to said rear sprocket by a main chain, and which further includes an idler pulley having an idler spring trained therethrough, and wherein the ends of said idler spring are connected to the free ends of said drive chains.

11. The vehicle of claim 10 which further includes a transverse frame member located adjacent the front end of said main longitudinal frame member for supporting said front wheels, and which further includes, for each wheel, a king pin steerably mounted to said transverse frame member for receiving thereon a front wheel, and a steering mechanism located intermediate said steering drive mechanism and said front wheels; wherein said steering mechanism includes a handle bar located atop said teeter arm; steering shafts extending through said teeter arm for oscillating movement therewith and rotatable movement therein, having said handle bar fixed to the upper terminus thereof; a steering torque tube connected to the lower terminus of said steering shafts and extending through the forward end of said main longitudinal frame member; a removable crank fixed to the forward end of said steering torque tube; and, for each front wheel: an adjustable length first steering arm having one end thereof attached to said removable crank; a bell crank attached to the other end of said first steering arm; an adjustable length second steering arm attached at one end thereof to said bell crank and attached at the other end thereof to said king pin.

12. The vehicle of claim 11 wherein said transverse frame member is removable from said vehicle.

13. The vehicle of claim 10 which includes a brake rotor mounted on each of said front wheels, a brake caliper for each rotor, and a hand lever and brake cable to operate the brake calipers in unison.

14. The vehicle of claim 10 which includes a seat mounted on said main longitudinal frame, wherein said main longitudinal frame includes an adjustable seat mount for providing fore and aft movement of said seat, and which further includes an adjustable seat back support for adjusting the incline of said seat back.

15. The vehicle of claim 10 wherein said rear sprocket includes plural, ganged sprockets, and which further include a derailleur and shifter for moving a main drive chain to a selected one of said ganged sprockets.

16. The vehicle of claim 10 wherein said first drive linkage is connected to a lower connection point located below said teeter arm mount on said teeter arm and provides power during a first power stroke, and wherein said second drive linkage is connected to an upper connection point located below said teeter arm mount and provides power during a second power stroke, and wherein, for equal movement of said teeter arm in said for and aft directions, the motive force of said first power stroke is between about one to three times that of said second power stroke.

17. The vehicle of claim 10 which includes a power-assisted motor and a battery therefore which engages said rear wheel to provide an auxiliary motive force.

18. The vehicle of claim 17 which further includes a vital signs and ride profile monitor, wherein said vital signs and ride profile monitor has a maximum heart rate set mechanism for setting a maximum allowable heart rate, and wherein said power-assist motor is activated by said vital signs and ride profile monitor when a rider's heart rate approaches said maximum allowable heart rate.

19. The vehicle of claim 17 which further includes an adjustable dynamometer coupleable to said rear wheel, and a vital signs and ride profile monitor having a memory therein, and which further include computer-compatible I/O ports, and which further includes a stroke rate sensor, a speed sensor and a torque sensor, which sensors provide stroke rate, speed and torque information comprising a ride profile to said vital signs and ride profile monitor, wherein said ride profile is stored in said memory during a ride, and wherein said ride profile may be downloaded to program a dynamometer to simulate the stored ride profile.

20. A human-powered, ride-on vehicle, comprising:
- a main longitudinal frame member having a steering/drive mechanism mounted thereon for oscillating movement;
- a rear wheel receiver located adjacent one end of said main longitudinal frame member;
- a driven rear wheel having an axle, wherein said axle is received in said rear wheel receiver;
- a rear sprocket operatively fixed to said rear wheel for coastable engagement therewith;
- a transverse frame member located adjacent the front end of said main longitudinal frame member for supporting a pair of spaced apart, steerable front wheels, operatively connected to said steering/drive mechanism, wherein said transverse frame member is removable from said vehicle, wherein said transverse frame member includes, for each wheel, a king pin steerably mounted to said transverse frame member for receiving thereon a front wheel, and a steering mechanism located intermediate said steering drive mechanism and said front wheels;
- wherein, said steering/drive mechanism includes:
  - a teeter arm mounted on a teeter arm mount to said main longitudinal frame member intermediate the ends thereof for pivoting movement in a fore direction and an aft direction;
  - wherein said steering mechanism includes a handle bar located atop said teeter arm for use by a rider to impart a motive force to the vehicle; steering shafts extending through said teeter arm for oscillating movement therewith and rotatable movement therein, having said handle bar fixed to the upper terminus thereof; a steering torque tube connected to the lower terminus of said steering shafts and extending through the forward end of said main longitudinal frame member; a removable crank fixed to the forward end of said steering torque tube; and, for each front wheel: an adjustable length first steering arm having one end thereof attached to said removable crank; a bell crank attached to the other end of said first steering arm; an adjustable length second steering arm attached at one end thereof to said bell crank and attached at the other end thereof to said king pin; and
- a drive mechanism for imparting said motive force to said rear wheel.

21. The vehicle of claim 20 wherein said drive mechanism includes first and second drive linkages, wherein said first drive linkage provides a motive force to said driven rear wheel during a first power stroke and said second drive linkage provides a motive force to said driven rear wheel during a second power stroke, and wherein said drive linkages are connected to said teeter arm; wherein said drive linkages each include a connection point on said teeter arm, a drive chain connected at one end thereof to said connection point, and a drive sprocket driven by said drive chain; and which includes a drive axle extending through and operable with said drive sprockets to drive a front sprocket, which is connected to said rear sprocket by a main chain, wherein said first drive linkage is connected to a lower connection point located below said teeter arm mount on said teeter arm and provides power during a first power stroke, and wherein said second drive linkage is connected to an upper connection point located below said teeter arm mount and provides power during a second power stroke, which includes an idler pulley having an idler spring trained therethrough, and wherein the ends of said idler spring are connected to the free ends of said drive chains; and which further include an oscillating longitudinal frame member received for oscillating movement in a channel in said main longitudinal frame member, wherein said oscillating longitudinal frame member is pivotally connected to said teeter arm for providing motive force to the vehicle, and wherein said oscillating longitudinal frame member has foot pedal located thereon.

22. The vehicle of claim 20 which includes a power-assisted motor and a battery therefore which engages said rear wheel to provide an auxiliary motive force.

23. The vehicle of claim 22 which further includes a vital signs and ride profile monitor, wherein said vital signs and ride profile monitor has a maximum heart rate set mechanism for setting a maximum allowable heart rate, and wherein said power-assist motor is activated by said vital signs and ride profile monitor when a rider's heart rate approaches said maximum allowable heart rate.

24. The vehicle of claim 22 which further includes an adjustable dynamometer coupleable to said rear wheel, and a vital signs and ride profile monitor having a memory therein, and which further include computer-compatible I/O ports, and which further includes a stroke rate sensor, a speed sensor and a torque sensor, which sensors provide stroke rate, speed and torque information comprising a ride profile to said vital signs and ride profile monitor, wherein said ride profile is stored in said memory during a ride, and wherein said ride profile may be downloaded to program a dynamometer to simulate the stored ride profile.

* * * * *